H. W. DOVER.
HANDWHEEL.
APPLICATION FILED SEPT. 30, 1920.
1,412,678.
Patented Apr. 11, 1922.
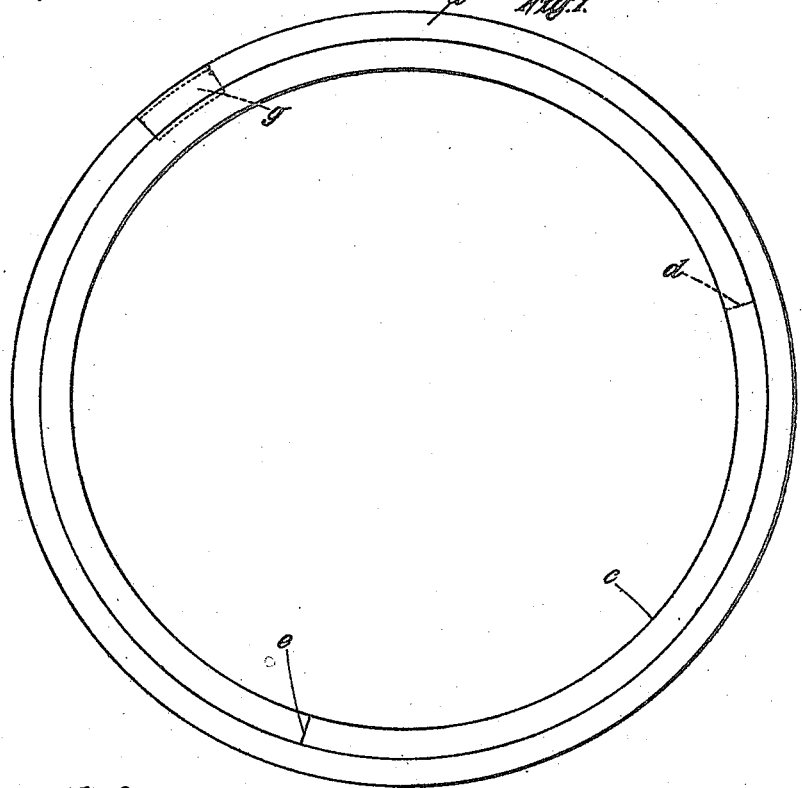
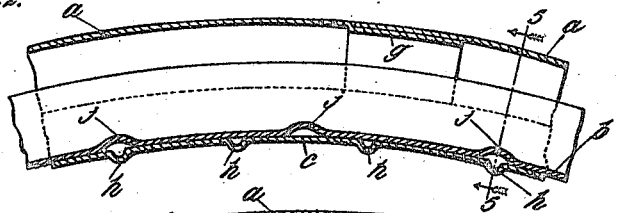
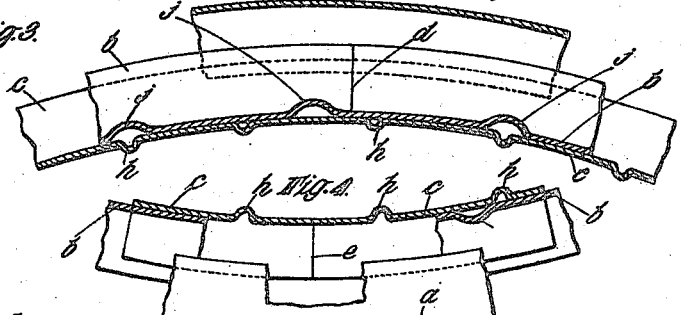
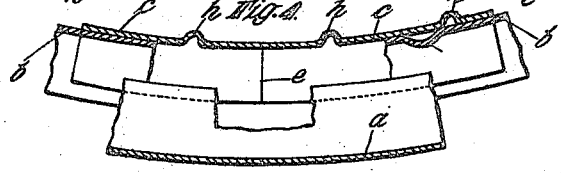
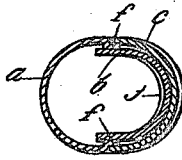  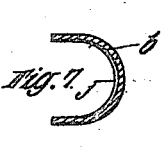 
INVENTOR
HORACE W. DOVER
BY
ATTORNEYS

UNITED STATES PATENT OFFICE.

HORACE WALTER DOVER, OF ST. JAMES, ENGLAND.

HANDWHEEL.

1,412,678.  Specification of Letters Patent.  Patented Apr. 11, 1922.

Application filed September 30, 1920. Serial No. 413,853.

*To all whom it may concern:*

Be it known that I, HORACE WALTER DOVER, a British subject, of Holywood, St. James, Northampton, England, have invented certain new and useful Improvements in or Relating to Handwheels, of which the following is a specification.

This invention relates to hand wheels such for instance as are employed for steering motor vehicles, for operating stop cocks, controlling aircraft, motor boats, gun mechanism, and for other purposes, and has for its object to facilitate the assembling of the parts of the wheel and to cheapen the cost of construction.

In this connection it has been proposed to build up hand wheels (more particularly for use as steering hand wheels for motor cars) from a pair of stampings or pressings, the respective halves being welded or brazed together at their contiguous edges by the electric or acetylene process, and the stampings or pressings being furnished, for the purpose of facilitating the brazing or welding together of the halves, with corresponding marginal portions which have subsequently to be removed either by grinding or filing when the two parts are permanently joined together. It has also been proposed in the specification accompanying my prior British Letters Patent No. 2623 of 1906 to build up the rim-portion of a hand wheel in the form of a sheet-metal tube covered with celluloid or the like, the rim being made from two channelled members and a stiffening-band, the former being secured by seaming their edges over those of the stiffening band.

According to the present invention the rim-portion of a hand wheel is built up of annular inner and outer peripheral portions, of which the inner peripheral portion is constituted by two parts each of concavo-convex cross-section arranged one within the other with their free edges spaced slightly from one another, and of which the outer peripheral portion is of concavo-convex cross-section and shouldered or off-set inwardly at its marginal portions, so that said off-set marginal portions may fit between the free edges of the two parts of the inner peripheral portion of the rim and the outer surfaces of said inner and outer peripheral portions may be substantially continuous.

The inner part of the inner peripheral portion of the rim may be of sharper curvature than the outer part so that whilst said parts are tangential at the centre of their transverse curvature their free edges are spaced slightly from one another, and said inner part may also be ribbed or corrugated transversely for strengthening purposes.

The inner and outer peripheral portions may be formed in continuous lengths and cut to the required length and the ends of said portions are arranged so as to break joint.

In the accompanying drawings which illustrate one form of the invention Figure 1 is a plan of a rim-portion, Figures 2, 3 and 4 are enlarged sectional plans shewing the joints of the portions taken on the central horizontal plane of the rim-portion, Figure 5 is a cross-section of the rim on the line 5—5, Figure 2, and Figures 6, 7 and 8 are similar cross-sections of the portions of the rim.

As shown the rim-portion of a hand wheel is built up of an annular outer peripheral portion $a$ and an annular inner peripheral portion constituted by two parts $b$, $c$ each of concavo-convex cross-section as shewn in Figures 7 and 8. The parts $b$ and $c$ having been cut to the required length are arranged the one $b$ within the other $c$ so that the ends of each abut and break joint as at $d$ and $e$ respectively, see Figures 1, 3 and 4 and so that the one $b$ forms a liner for the other $c$ said parts $b$ and $c$ are then pierced to receive the outer ends of the arms of the wheel (not shown) and said outer ends are fitted in position. The joints $d$ and $e$ of the parts $b$ and $c$ and the junctions of the outer ends of the arms and the inner peripheral portion $b$, $c$ are then brazed, welded or similarly treated so as to unite the parts. The inner part $b$ is of sharper curvature than the outer part $c$ so that whilst said parts are tangential at the centre of their transverse curvature their free edges are spaced slightly from one another as shewn in Figure 5. The outer peripheral portion $a$ is also of concavo-convex cross-section and is shouldered or offset inwardly at its marginal portions $f$, $f$, Figure 5, so that said off-set marginal portions $f$, $f$ may fit between the free edges of the parts $b$ and $c$ of the inner peripheral portion of the wheel and the outer surfaces of said inner and outer peripheral portions may be substantially continuous as shewn in Figure 5. The outer peripheral portion $a$ is not only shouldered at its lateral marginal portions $f$, $f$ but one end is also similarly off-set so as to provide a tongue $g$, adapted to underlie the other end, as shewn in Figure 2 without impairing the continuity of the outer surface of the outer peripheral portion $a$, when the latter is sprung into position with its off-set lateral marginal portions $f, f$ fitting between the free edges of the two parts $b$ and $c$ of the inner peripheral portion. The lap joint of the outer peripheral portion $a$ is then brazed, welded or similarly treated and if desired the junction between the inner and outer peripheral portions $b, c$ and $a$ may also be so treated.

The rim-portion of the wheel is then encased in a casing (not shewn) of celluloid, exonite, or similar material, or of a noninflammable material capable of being moulded in a similar manner, applied according to any of the well-known methods of manufacture (e. g. moulding), and the arms or nave of the wheel may be wholly or partially encased in a similar manner.

In some cases the parts may be first wrapped spirally with a tape of linen or other fabric, after which the covering compound or material may be applied as above mentioned.

If desired the external surface of the covering may be ribbed transversely to provide finger grips on the outer part $c$ of the inner peripheral portion and, as shown said part $c$ may itself be formed with ribs as at $h$ and further, if desired, the outer peripheral portion $a$ also may be formed with such ribs so as to maintain a uniform thickness of covering material and further strengthen the structure.

The inner part $b$ of the inner peripheral portion may also be ribbed as at $j$ for strengthening purposes.

The constituent parts of the wheel may be cheaply produced and very rapidly assembled as there are no rolled or seamed joints and furthermore the continuity of the outer surfaces of the inner and outer peripheral portions obviates the necessity of filling gaps or cavities before the covering is applied.

Having now particularly described and ascertained the nature of my said invention and in what manner the same is to be performed, I declare that what I claim is:—

1. A hand wheel whereof the rim-portion is built up of annular inner and outer peripheral portions, of which the inner peripheral portion is constituted by two parts each of concavo-convex cross-section arranged one within the other with their free edges spaced slightly from one another, and of which the outer peripheral portion is of concavo-convex cross-section and shouldered or off-set inwardly at its marginal portions, so that said off-set marginal portions may fit between the free edges of the two parts of the inner peripheral portion of the rim and the outer surfaces of said inner and outer peripheral portions may be substantially continuous.

2. A hand wheel as claimed in claim 1 wherein the inner part of the inner peripheral portion of the rim is of sharper curvature than the outer part so that whilst said parts are tangential at the centre of their transverse curvature their free edges are spaced slightly from one another.

3. A hand wheel as claimed in claim 1 wherein one of the parts of the inner peripheral portion of the rim is ribbed or corrugated transversely, substantially as set forth.

4. A hand wheel as claimed in claim 2, wherein both parts of the inner peripheral portion of the rim are ribbed or corrugated transversely, substantially as set forth.

5. A hand wheel as claimed in claim 1, wherein the outer peripheral portion of the rim is off-set at one end so as to provide a tongue adapted to underlie the other end substantially as set forth.

6. A hand wheel as claimed in claim 2 wherein the outer peripheral portion of the rim is offset at one end so as to provide a tongue adapted to underlie the other end, substantially as set forth.

7. A hand wheel as claimed in claim 3, wherein the outer peripheral portion of the rim is offset at one end so as to provide a tongue adapted to underlie the other end, substantially as set forth.

8. A hand wheel as claimed in claim 4, wherein the outer peripheral portions of the rim is offset at one end, so as to provide a tongue adapted to underlie the other end, substantially as set forth.

HORACE WALTER DOVER.